(12) United States Patent
Everhart et al.

(10) Patent No.: US 8,849,970 B1
(45) Date of Patent: Sep. 30, 2014

(54) TRANSPARENT REDIRECTION OF CLIENTS TO A SURROGATE PAYLOAD SERVER THROUGH THE USE OF A PROXY LOCATION SERVER

(75) Inventors: Craig Fulmer Everhart, Chapel Hill, NC (US); Daniel Joseph Ellard, Belmont, MA (US)

(73) Assignee: NetApp, Inc., Sunnyvale, CA (US)

( * ) Notice: Subject to any disclaimer, the term of this patent is extended or adjusted under 35 U.S.C. 154(b) by 1241 days.

(21) Appl. No.: 12/104,228

(22) Filed: Apr. 16, 2008

Related U.S. Application Data

(60) Provisional application No. 61/026,830, filed on Feb. 7, 2008.

(51) Int. Cl.
*G06F 15/16* (2006.01)

(52) U.S. Cl.
USPC ............................ 709/223; 709/230; 709/205

(58) Field of Classification Search
USPC .......................................... 709/223, 230, 205
See application file for complete search history.

(56) References Cited

U.S. PATENT DOCUMENTS

| | | | |
|---|---|---|---|
| 2006/0224752 A1* | 10/2006 | Parekh | 709/230 |
| 2007/0022121 A1* | 1/2007 | Bahar et al. | 707/10 |
| 2008/0005275 A1* | 1/2008 | Overton et al. | 709/218 |
| 2008/0207181 A1* | 8/2008 | Jiang | 455/414.1 |
| 2009/0144284 A1* | 6/2009 | Chatley et al. | 707/10 |

* cited by examiner

*Primary Examiner* — Lan-Dai T Truong
(74) *Attorney, Agent, or Firm* — DeLizio Gilliam, PLLC

(57) ABSTRACT

A client is redirected to use a surrogate payload server to access a substantially identical copy of an object that is located on a primary payload server. A proxy location server intercepts object location queries from clients and replies with the location of the surrogate payload server as the preferred source for the object rather than the location of the primary payload server.

20 Claims, 7 Drawing Sheets

TRANSPARENT REDIRECTION OF CLIENTS TO A SURROGATE PAYLOAD SERVER THROUGH THE USE OF A PROXY LOCATION SERVER

CLAIM OF PRIORITY

This application claims the benefit of U.S. Provisional Application No. 61/026,830, filed Feb. 7, 2008.

FIELD OF THE INVENTION

This invention relates to establishing new, improved and more-efficient communications between client computers and server computers over one or more public and/or private access computer networks, by transparently redirecting client computers to access a surrogate payload server for service of requests rather than to access a primary payload server for service of the requests. A proxy location server computer redirects the client requests from the primary payload server to the surrogate payload server. The surrogate payload server utilizes a substantially-identical copy of the information on the primary payload server to service the request. Performance is improved, and better and more efficient local administration of the computers is facilitated, while simultaneously diminishing difficulties, costs, time or other penalties incurred by directly accessing the primary payload server.

BACKGROUND OF THE INVENTION

In a well-known client-server relationship between two or more computers, a server computer ("server") executes a server program and provides a service to one or more client computers (each a "client"), each of which executes a client program. Generally the communication between the client and server computers occurs over a conventional public access computer communication network, for example the Internet, or over a conventional private-access computer communication network, for example a local area network, or over combinations of both public and private networks. In such a client-server relationship, one computer could be a client for some services and a server for other services. Typical services provided in a client-server relationship include file services, database services, and Hypertext Transfer Protocol (HTTP) services.

In many circumstances, multiple servers are available to supply the services to clients. Multiple servers may be employed to accommodate the volume of requests for services from clients and to improve the quality and performance of the service to the clients. There are many well-known ways to configure multiple servers to provide a service. Often a single server is designated as a principal or main server from which the other secondary servers obtain substantially-equivalent copies of the data and information needed to provide the service to clients.

One type of secondary server is a cache server. A cache server stores a substantially identical copy or copies of the data and programs resident on the principal server. A cache server may periodically communicate with the principal server to update the copy of the data stored on the cache server. A cache server responds to a service request from a client without necessarily communicating with a principal server to supply the stored data or other service that the client has requested. Another type of secondary server is a proxy server. Proxy servers forward service requests from the client to the principal server, but many proxy servers may also have a caching capability to store some data received from the principal server. Secondary servers typically utilize well-known techniques for eliminating expired or outdated data when the data stored on the principal server changes.

There are many reasons to set up a secondary server. Often, some penalty is avoided or reduced by having clients access the secondary server instead of the principal server. For example, the penalty may be unacceptably high network latency between the clients and the principal server due to a large physical distance and/or large number of network hops and/or traffic between the clients and the principal server. The penalty may also be security-related, such as a greater risk of unintended information exposure if the communication between clients and the principal server traverses unprotected networks.

It is often desirable in a client-server relationship to avoid storing on each client the address or location information of a particular server that each client accesses, since the location information of a server may change. The location of a server may be changed to improve the performance of the client-server relationship by reducing the number of separate network communications or hops between the client and server, for example. The location of a server may be changed by moving the service associated with the server to a different server, or the network address of a physical server may be changed, as other examples. The main disadvantage to storing the location of a server on a client is that location information on each of the multiple clients must be changed when the location of the server or service is changed.

Storing location information on clients can be avoided through the use of a location server. Location servers respond to queries from clients by supplying the location information of a primary or secondary server. If the location information for a particular resource changes, only the location information on the location server need be changed to enable the new location information to be supplied to multiple clients. The necessity to change the location information on each of many clients is avoided by the use of a location server. To distinguish location servers from the other servers, the other non-location servers which deliver the service are referred herein as payload servers. Location servers, like payload servers, can also be set up in a principal-secondary relationship.

The typical location information supplied is the address or location of an object. An object is a particular resource which resides on a payload server and which the client wishes to access and use. Some example objects are a database, a filesystem, or a service. Objects which are duplicated in a principal-secondary relationship are often each referred to as "instances" of the object. The object location typically contains the arbitrary name which identifies the particular resource and the network address of a payload server hosting or supplying the object. In a conventional Transport Control Protocol/Internet Protocol (TCP/IP) network, the IP address or the hostname of the payload server hosting the object at a particular point in time is part of the object location information. The hostname is a variant of a network address. Each computer has a network address, and the use of network addresses makes it possible to establish direct communications between individual clients and servers in a network.

For a client to access an object on a payload server whose location is stored on a location server, the client must have previously obtained information of the object name and the network address of the location server. The client queries the location server using its network address to obtain the location of the object. The object location supplied by the location server makes it possible for the client to thereafter directly access the payload server hosting the object and to obtain the requested services. The use of a location server also allows resources to be moved or distributed efficiently and periodically among multiple payload servers without changing the published location information associated with the resource.

Oftentimes it is desirable to have a group of clients obtain services from a secondary payload server instead of from a principal payload server that the clients have previously obtained services from. A difficulty arises in the case where the clients have been directed to the principal payload server by a location server that is managed by an uncooperative or unknown administrative entity. The difficulty is that the clients cannot be easily redirected to use the secondary payload server instead of the principal payload server if the location information sent from the location server cannot be changed. In this circumstance, each of the clients must be programmed to access the secondary payload server directly. Updating numerous clients with location information to refer them to the secondary payload server incurs some type of penalty, and in some circumstances may be infeasible or prohibitively costly.

Programming clients to access different payload servers from ones they have been previously programmed to access can present a significant penalty in the form of administrative difficulty, particularly when there are a relatively large number of local clients, which is typically the case in a large organization which makes intensive use of computers. When a remote location server is involved it may be an almost impossible task to change the object location information for requests only from local clients, because the remote location server will also be responding to requests from other non-local clients which should not be redirected.

Local and remote computers are typically located at physically or geographically different sites, but under some circumstances there may be no significant physical or geographical separation. However in each case, the local computers are administered and controlled locally by one administrative entity, and the remote computers are administered and controlled remotely by a different administrative entity. Communication between the local and remote computers usually entails a penalty, such as additional cost and network latency, compared to communications between computers only at the local site.

Responses to service requests from non-local clients must continue to be directed only to a remote principal payload server, and not to a local secondary payload server, because the local secondary payload server is often intended for the exclusive use and benefit of local clients. Furthermore, the remote location server is under the control of an administrative entity different from that which controls the local secondary payload server, thereby making it very unlikely that the remote location server will be programmed to respond to requests from local clients in a manner different from the manner that it responds to requests from non-local computers, especially where there is no relationship between the administrative entities.

SUMMARY OF THE INVENTION

The present invention offers a straightforward and convenient technique for redirecting local client requests for services from a primary payload server to a surrogate payload server. Local clients access a local proxy location server which, rather than supply the location information of the primary payload server, supplies amended location information which the local client thereafter uses to access a surrogate payload server. The requested services are supplied to the local client by the surrogate payload server without incurring a penalty caused by the necessity to communicate with the primary payload server over a public or private communication network. Redirecting local queries for object location in this manner does not require each of the local clients to be programmed individually to directly address the surrogate payload server. The redirection from the proxy location server is transparent to the local clients. Also, redirecting local clients to use a surrogate payload server does not interfere with the use of the primary location server or the primary payload server by other clients which may obtain location information directly from the primary location server or which obtain services from the primary payload server. There is no need for reprogramming the primary location server to address the requests from the local clients, since that functionality is achieved and controlled through the proxy location server. The location information supplied by the proxy location server is easily edited by the local administrative entity to add or remove surrogate payload servers as needs change for the requested services. Similarly, there is no need to reprogram the primary location server when a surrogate payload server is implemented.

In accordance with these and other features, one aspect of the invention relates to a computer system comprising a client, a surrogate payload server, a proxy location server, a primary location server and a primary payload server. The local surrogate payload server hosts an object that is the same as or substantially identical to the object hosted by the primary payload server. The proxy location server responds to queries from clients seeking location information of an object by supplying the location of the surrogate payload server which hosts the substantially identical copy of the object. The client thereafter uses the supplied amended location information to access and obtain services from the surrogate payload server which are substantially identical to those services which would have been supplied from the primary payload server if it had been accessed.

Another aspect of the present invention involves or relates to a method of redirecting a client to use a surrogate payload server which hosts an object that is the same or substantially identical to an object hosted on a primary payload server. A proxy location server responds to client requests by supplying location information for objects on the surrogate payload server. The proxy location server derives object location information from a primary location server, but the proxy location server also uses a proxy redirection list which takes precedence over object location information obtained from the primary location server. The client is redirected to use the object on the surrogate payload server instead of the object on the primary payload server by amending the location information contained in the proxy redirection list which maps the object name to the location of the surrogate payload server.

In another aspect of the invention, a local client uses a local Domain Name System (DNS) proxy server to request the name of a server providing a service in a remote DNS domain. The local DNS proxy server responds with the name of a local surrogate payload server as the preferred server responsible for the service in the remote DNS domain. The local DNS proxy server uses a Service (SRV) record to supply the redirection information, in addition to forwarding the service query to a remote DNS server responsible for providing authoritative information for the remote DNS domain.

A broader aspect of the invention involves amending location information locally to direct clients to a surrogate payload service rather than to the primary payload service identified by published location information. The client accesses a local location service that would otherwise ordinarily respond with the location of the published payload service, but in the case of the present invention, the local location service amends the location information in response to the client request to redirect the client to use the surrogate payload service.

Other aspects of the invention, and a more complete appreciation of the present invention, as well as the manner in which the present invention achieves the above and other improvements, can be obtained by reference to the following detailed description of presently preferred embodiments taken in connection with the accompanying drawings, which are briefly summarized below, and by reference to the appended claims.

DETAILED DESCRIPTION

Figure 1:
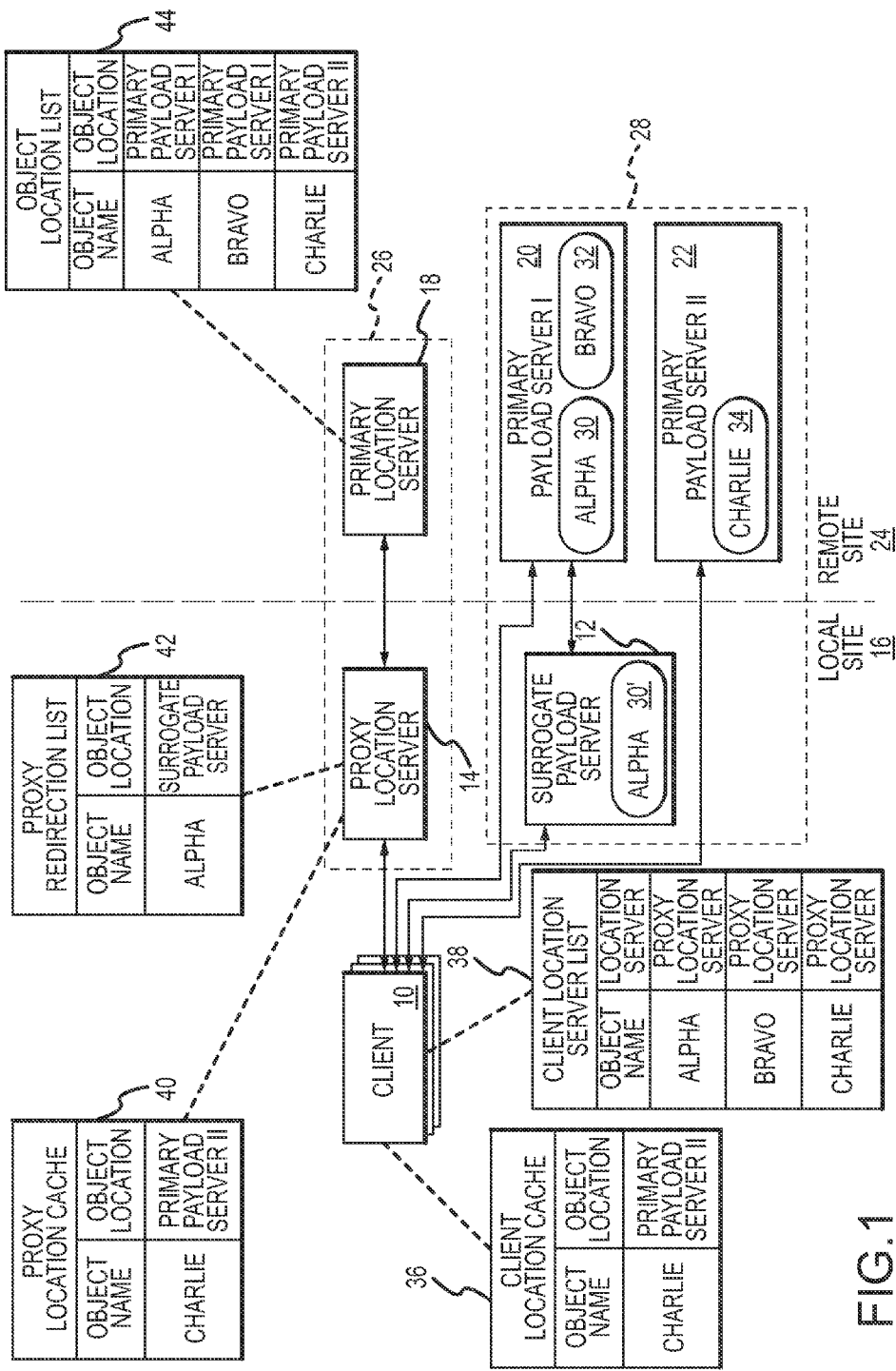
FIG. 1 is a diagrammatic illustration of local and remote computers and their interaction which form one embodiment of the present invention.

An exemplary network of local and remote client and server computers in which the present invention is implemented is shown in FIG. 1. The network over which the computers communicate with each other and exchange information is a private and/or public computer communication network in which communications are represented by lines that terminate with arrow heads.

At least one and usually a plurality of client computers (each a "client 10"), at least one surrogate payload server computer ("surrogate payload server 12"), and a proxy location server computer ("proxy location server 14") are located at a local site 16 and are administered or controlled locally. A primary location server computer ("primary location server 18"), and two or more primary payload server computers, exemplified by a first primary payload server 20 (shown as "primary payload server I") and a second primary payload server 22 (shown as "primary payload server II"), are located at a remote site 24 and are administered and controlled remotely by an administrative entity other than the administrative entity which controls and administers the computers at the local site 16. The proxy location server 14 and the primary location server 18 are both location servers 26. The surrogate payload server 12, the first primary payload server 20 and the second primary payload server 22 are all payload servers 28. The surrogate servers typically eliminate expired or outdated data when the data stored on their principal server(s) change (s).

Communication between computers within the local site 16 and the remote site 24 involves additional cost and network latency compared to communications between computers at the local site 16. This additional cost and increased network latency is an example of a penalty that can be avoided through the implementation of the present invention. Other types of penalties may also be incurred, even when the computers or most of them are co-located at the same physical or geographical site. The convention of describing the computers as "local" or "remote" herein is one of convenience of description rather than a limitation on the scope of the invention.

Exemplary resources or objects "alpha," "bravo," and "charlie" are available for use by the clients 10, and instances of these objects are shown as residing on different payload servers 28. For example, object alpha 30' is hosted by the surrogate payload server 12 and object alpha 30 is hosted by the first primary payload server 20, object bravo 32 is hosted by the first primary payload server 20, and object charlie 34 is hosted by the second primary payload server 22. The surrogate payload server 12 is a surrogate server for the first primary payload server 20 for object alpha 30, as a result of object alpha having been copied substantially identically from the first primary payload server 20 to the surrogate payload server 12.

A common client-server communication response over which the present invention is an improvement begins when the client 10 queries the proxy location server 14 to obtain object location information for objects or resources requested by the client 10. The requested resources are available from one of primary payload servers 20 and 22. The proxy location server 14 then queries the primary location server 18 for the object information. The response from the primary location server 18 includes the location of the object on one of the primary payload servers 20 or 22, which is then used by the client 10 to communicate with the first or second primary payload server 20 or 22 to access and utilize the object. Communication paths between the client 10 and the primary payload servers 20 and 22 are shown in FIG. 1. The query and response between the proxy location server 14 and the primary location server 18, and the service request and the service communication between the primary payload servers 20 and 22 and the client 10 occur between the local site 16 and a remote site 24.

The improvements of the present invention involve transparently redirecting the service requests from the client 10 to the surrogate payload server 12. The surrogate payload server 12 and the first primary payload server 20 both host an instance of the object or resource for which the client 10 has requested location information. As shown in FIG. 1, the surrogate payload server 12 and the first primary payload server 20 each have instances of the object alpha 30' or 30 available for use, and those instances are substantially identical. The client 10 determines the location that it will use to access the object alpha 30 or 30' by querying the proxy location server 14. The proxy location server 14 usually obtains the location of an object by querying the primary location server 18, or by supplying the object location without querying the primary location server 18 if the proxy location server 14 already possesses this information as a result of previous queries to the primary location server 18. An important improvement of the present invention lies in the proxy location server 14 supplying amended location information for an object which identifies the local surrogate payload server 12 as a source of the requested service or object other than one of the two primary payload servers 20 or 22.

The amended location information is established by the administrative entity which edits and maintains location information on the proxy location server 14 to enable mapping the surrogate payload server 12 to the substantially identical instance of the object alpha 30' hosted by the surrogate payload server 12. The amended location information takes precedence over location information derived from the primary location server 18. The client 10 thereafter uses the object name and amended object location to obtain the requested service from the local surrogate payload server 12 rather than one of the primary payload servers 20 or 22.

In this manner, it is possible to substantially reduce communications outside of the local site 16 over the network to the primary location server 18 and to the primary payload servers 20 and 22 at the remote site 24, when the requested service is available from a local surrogate payload server 12. The cost of using the network services is reduced, latency delays associated with clients communicating over an extensive network are reduced or avoided, and better responsiveness is achieved because the communications occur substantially within the local site 16. If a communication to the remote site 24 is required, it will usually be because the proxy location server 14 does not have the object name and object location information as a result of a previous query to the primary location server 18. However, such remote communications are normally abbreviated compared to the more extensive amount of remote communication necessary to obtain and deliver the requested payload service. Other penalties, such as additional administrative overhead, may be avoided even when the proxy location and surrogate payload computers are co-located at the same site.

Using the proxy location server 14 in this manner transparently redirects each client 10 to use the surrogate payload server 12 where a substantially identical instance of the requested object is available on the surrogate payload server 12, by using the object location information supplied by the proxy location server 14. The ability to easily establish and edit the location information supplied by the proxy location server 14 also allows the easy addition and removal of additional local surrogate payload servers (similar to that one at 12) without programming each of the clients individually to directly access the local surrogate payload servers 12 and without attempting to remotely manipulate the object location information on the primary location server 18.

To accomplish the transparent redirections in accordance with the present invention, each of the clients 10, the proxy location server 14 and the primary location server 18 have data structures 36, 38, 40, 42 and 44 recorded in their memories (not otherwise shown) which contain information that maps object names to object locations (as is the case with 36, 40, 42 and 44) or information that designates a location server 26 as capable of providing location information for an object name (as is the case with 38). The data structures associated with each client 10 are a client location cache 36 and a client location server list 38. The data structures associated with the proxy location server 14 are a proxy location cache 40 and a proxy redirection list 42. The data structure associated with the primary location server 18 is an object location list 44. As shown in FIG. 1, dashed lines connect the data structures with the computers having the memories which establish the data structures 36, 38, 40, 42 and 44.

The client location cache 36 of each client 10 stores information mapping object names to object locations. For example, the object "charlie" is specified in the client location cache 36 as residing on the second primary payload server 22. This mapping information is present in the client location cache 36 as a result of a previous query to the proxy location server 14 seeking the location of the object charlie 34. Storing object location information in the client location cache 36 improves performance since the client 10 does not need to query the proxy location server 14 to determine the location of an object that is already present in the client location cache 36. The location information in the client location cache 36 is ideally erased periodically to force the proxy location server 14 to query the remote primary location server 18 to obtain updated location information. Otherwise, the client 10 might never be made aware of a change of location for an object on the proxy location server 14 or the primary location server 18.

The client location server list 38 of each client 10 stores information mapping object names to location servers 26. The client location server list 38 allows the client 10 to determine which location server 14 or 18 should be queried to determine the location of a particular object. The client location server list 38 correlates the object name with the location server 14 or 18 that can provide location information for the object. For example, object names "alpha," "bravo" and "charlie" are included in the client location server list 38, and the location server 26 responsible for providing location information for these three objects is shown as the proxy location server 14. Thus, the client is directed to contact the proxy location server 14 for location information concerning object names "alpha," "bravo," and "charlie." The client location server list 38 affords the client 10 the ability to query the appropriate location server 14 or 18 which possesses the location information of the requested object.

Object name and object location mappings are derived when they are directly obtained from the primary location server 18. The proxy location cache 40 of the proxy location server 14 stores the derived mappings between object names and object locations obtained from past queries to a location server 26, in this example the primary location server 18. For example, the proxy location cache 40 shows that the object charlie resides on the second primary payload server 22.

The proxy redirection list 42 of the proxy location server 14 stores mappings between object names and the redirected object locations. For example, object alpha is shown in the proxy redirection list 42 as hosted by the surrogate payload server 12, even though the derived location for object alpha is on the first primary payload server 20. Object location information supplied from the proxy redirection list 42 results in redirecting the client 10 to a surrogate payload server, such as surrogate payload server 12. The object name and object location information contained in the proxy redirection list 42 is manually programmed into that list.

The proxy redirection list 42 contains location information for objects that is different from the location information for the same objects contained in the object location list 44 of the primary location server 18. The object location list 44 stores mappings between object names and object locations which typically, but not necessarily exclusively, reside on computers at the remote site 24. For example, objects alpha, bravo and charlie are shown residing on the first primary payload server 20, the first primary payload server 20 and the second primary payload server 22, respectively. The primary location server 18 uses the object location list 44 to respond to requests. The object name and object location information contained in the object location list 44 is manually programmed into that list.

The proxy location server 14 receives location queries from the client 10 requesting location information for specific object names, and the proxy location server 14 replies to the client 10 with the requested object location information, by supplying information from the proxy redirection list 42 or by supplying information from the proxy location cache 40 or by querying the primary location server 18 to obtain information from the object location list 44. The location information for an object in the proxy redirection list 42 takes precedence over the location information for the same object derived from the object location list 44 of the primary location server 18. The redirection of the client 10 is performed by substituting or appending in each reply to a request from a client 10, the amended or redirected object location information from the proxy redirection list 42. The amended location information or substitution supplies new redirected object location information for the requested object in response to the present and all future queries from a client 10 for that object or resource.

If the request to the proxy location server 14 identifies an object name which is not in the proxy redirection list 42 or the proxy location cache 40, the proxy location server 14 queries the primary location server 18 requesting location information for the requested specific object name. The primary location server 18 replies by supplying the requested object location information. The mapping of object names to object locations in the proxy location cache 40 is derived from these types of queries to the primary location server 18. The proxy location cache 40 improves the performance of the proxy location server 18 in the same manner that the client location cache 36 improves the performance of the client 10, by avoiding the penalty for queries from the proxy location server 14 at the local site 16 to the primary location server 18 at the remote site 24, thereby eliminating or reducing additional communications between the local site 16 and the remote site 24. The proxy redirection list 42 allows the local administrative entity to remap the location information for an object to a payload server 28 at the local site 16 (surrogate payload server 12) rather than to a payload server 28 at the remote site 24 (primary payload servers 20 or 22).

Figure 2:
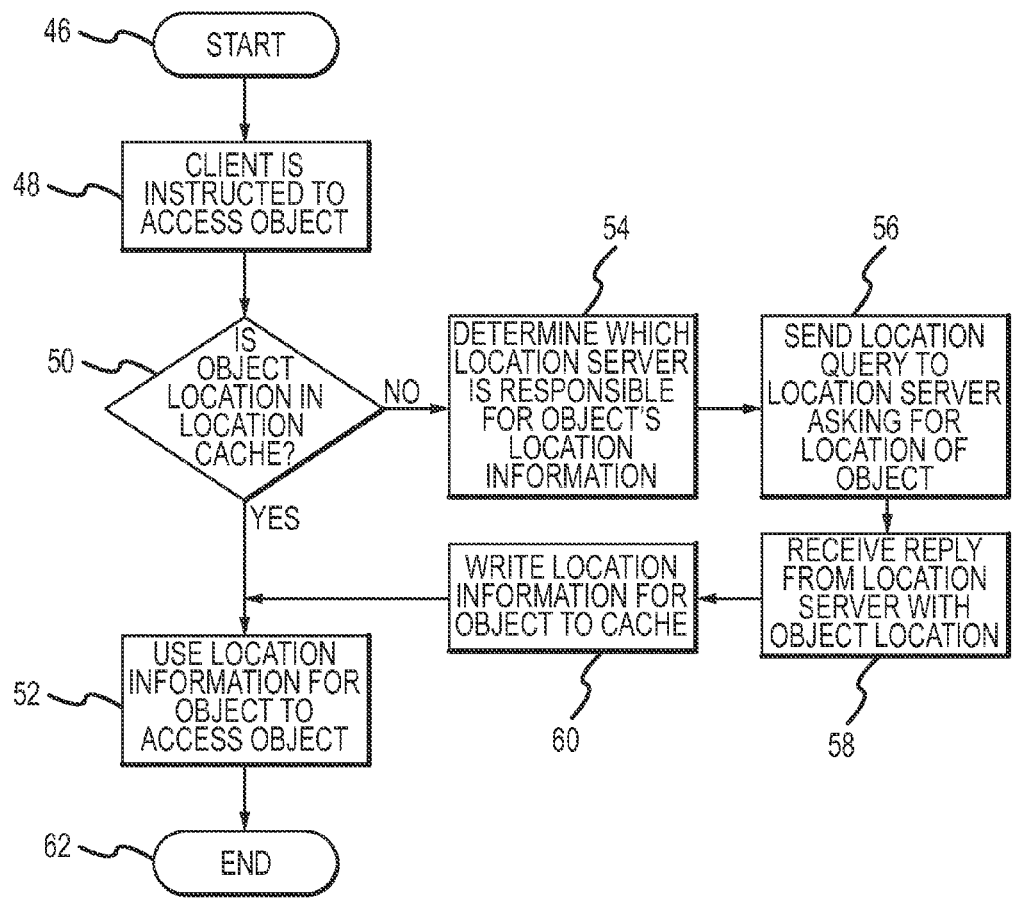
FIG. 2 is a flow chart of exemplary actions taken by local clients shown in FIG. 1.

The process or logic flow of functions performed by the client 10 (FIG. 1) to find the location of an object is shown in FIG. 2. The logic flow starts at 46 and the client is instructed to access an object at 48. At 50, the client 10 consults the client location cache 36 (FIG. 1) to determine if location information for the object is present in the client location cache 36. If the determination at 50 is affirmative then the client 10 uses the information in the client location cache 36 to initiate a communication to access the object, at 52. If the determination at 50 is negative, the client 10 then, at 54, searches for the object name in the client location server list 38 (FIG. 1) to determine which location server 26 (FIG. 1) is mapped to the object name, thereby determining which location server 26 to query for location information regarding the object. The client 10 then sends a query, at 56, to that location server 26 requesting the location of the object. At 58, the client 10 receives a reply from the location server 26 with the location of the object. The client 10 then writes, at 60, the location information for the object to the client location cache 36. Thereafter, at 52, the client 10 uses the location information for the object to access the object. After the client 10 has accessed the object at 52, the exemplary logic flow ends at 62.

Figure 3:
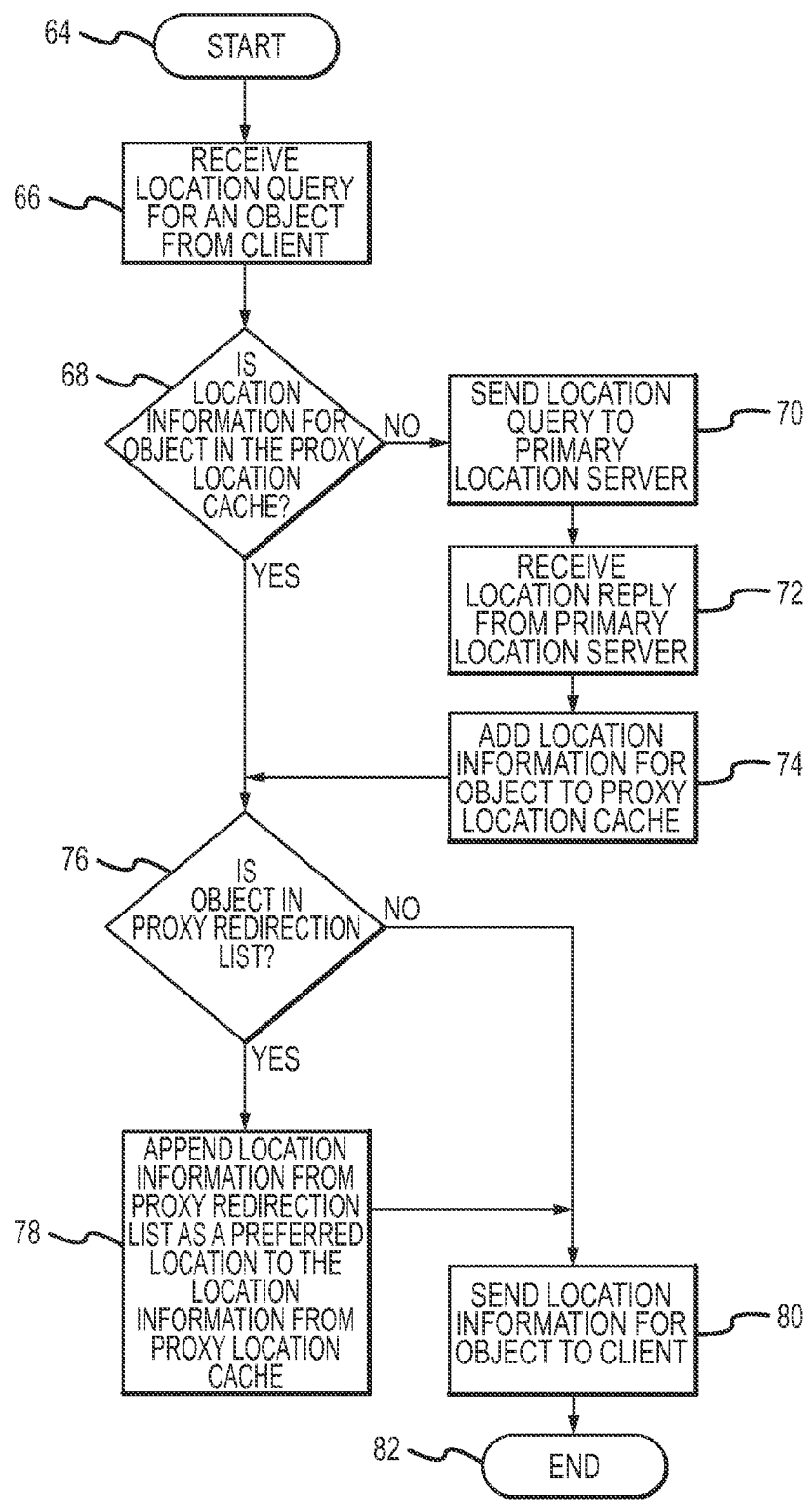
FIG. 3 is a flow chart of exemplary actions taken by a proxy location server shown in FIG. 1.

The process or logic flow of the functions performed which the proxy location server 14 (FIG. 1) executes upon receipt of a location query for an object is shown in FIG. 3. The logic flow starts at 64, after which the proxy location server 14 receives a location query for an object from the client 10 (FIG. 1), at 66. The proxy location server 14 then checks the proxy location cache 40 (FIG. 1), at 68, to determine if an entry exists for the object. If the determination at 68 is negative the proxy location server 14 sends a location query to the primary location server 18 (FIG. 1) seeking the location of the object, at 70. A reply from the primary location server 18 is received at 72 indicating the location for the object which was obtained from the object location list 44 (FIG. 1). At 74, the proxy location server 14 then adds the location information for the object to the proxy location cache 40 (FIG. 1). The proxy location server 14 then checks to determine if the object name is in the proxy redirection list 42 (FIG. 1) at 76. The determination at 76 is also reached if the determination at 68 is affirmative. If the object name is not in the proxy redirection list 42, then the determination at 76 is negative and at 80, the proxy location server 14 sends a reply to the client 10 with the location for the object obtained from the proxy location cache 40, at 80. If the object name is in the proxy redirection list 42, then the determination at 76 is affirmative and at 78, the proxy location server 14 appends the location for the object from the proxy redirection list 42 to the location information for the object from the proxy location cache 40. The proxy location server 14 then sends the appended location information to the client at 80. At 82, after the location information for the object is sent to the client 10, the logic flow ends.

Figure 4:
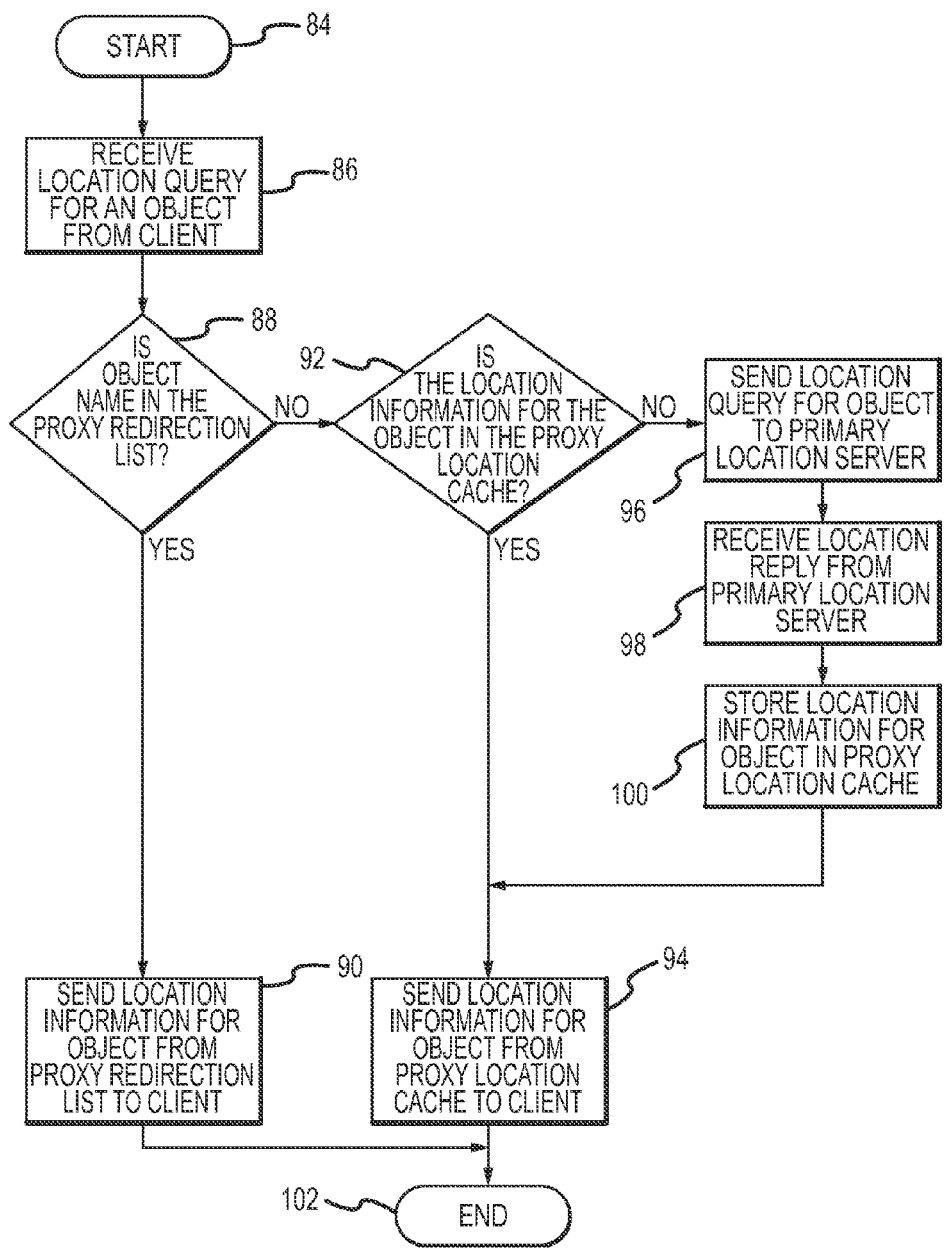
FIG. 4 is a flow chart of exemplary actions taken by the proxy location server shown in FIG. 1.

An alternative process or logic flow which the proxy location server 14 (FIG. 1) could follow upon receipt of a location query for an object is shown in FIG. 4. The logic flow starts at 84. The proxy location server 14 receives a location query for an object from the client 10 (FIG. 1) at 86. At 88, the proxy location server 14 determines if the object name is in the proxy redirection list 42 (FIG. 1). If the determination at 88 is affirmative, then at 90 the proxy location server 14 sends a reply to the client 10 containing the location information for the object obtained from the proxy redirection list 42. If the determination at 88 is negative, then at 92 the proxy location server 14 determines if the location information for the object is in the proxy location cache 40 (FIG. 1). If the determination at 92 is affirmative, then at 94 the proxy location server 14 sends a reply to the client 10 containing the location information for the object obtained from the proxy location cache 40. If the determination at 92 is negative, then at 96 the proxy location server 14 sends a location query for the object to the primary location server 18 (FIG. 1). At 98, the proxy location server 14 receives a reply from the primary location server 18 containing location information for the object. At 100, the proxy location server 14 then stores the location information for the object in the proxy location cache 40 (FIG. 1). The proxy location server 14 then replies at 94 to the client 10 with the location information for the object from the proxy location cache 40. After the client has been sent location information at 90 or at 94 the logic flow ends at 102.

Figure 5:
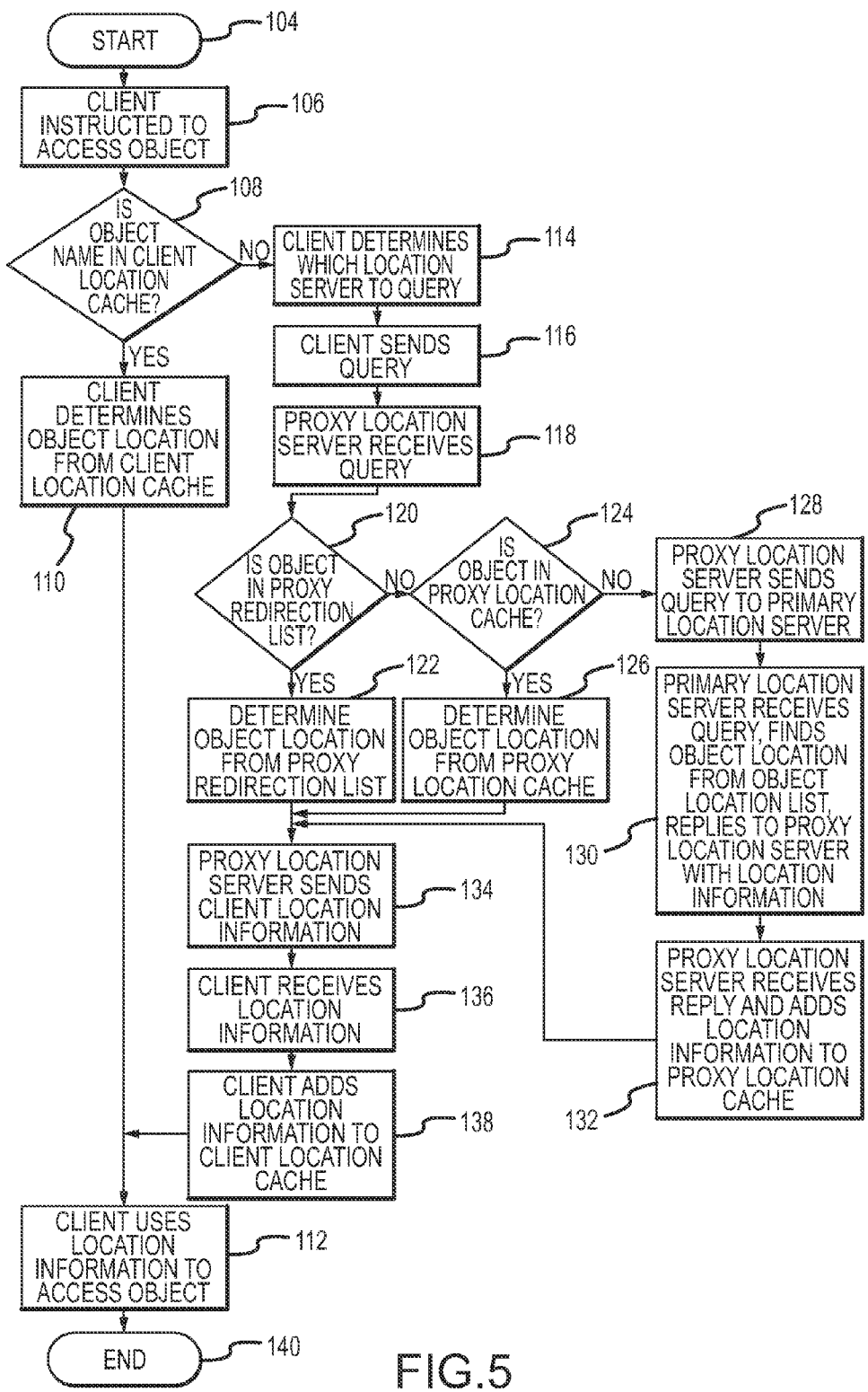
FIG. 5 is a flow chart of overall functionality or process performed by the computers shown in FIG. 1, in accordance with the present invention.

An exemplary process or logic flow of the functions involved in interaction between the computers shown in FIG. 1 when the client 10 accesses an object is shown in FIG. 5. The logic flow starts at 104. The client 10 (FIG. 1) is instructed to access an object at 106. The client 10 then checks the client location cache 36 (FIG. 1) to determine if there is an entry for the object name at 108. If the determination at 108 is affirmative, then at 110 the client 10 determines the object location mapped to the object name from the information in the client location cache 36. The client 10 then uses the location information to access the object at 112.

If the determination at 108 is negative, then at 114, the client 10 determines which location server 26 (FIG. 1) to query for location information for the object by searching for the location server, e.g. the proxy location server 14 (FIG. 1), which is mapped to the object name in the client location server list 38 (FIG. 1). At 116 the client 10 sends a location query to the location server, e.g. the proxy location server 14 (FIG. 1), requesting the location of the object named in the query. The proxy location server 14 receives the query at 118. The proxy location server 14, at 120, determines if the object name is in the proxy redirection list 42 (FIG. 1). If the determination at 120 is affirmative, then at 122 the proxy location server 14 determines the object location by searching the proxy redirection list 42 for the object name and the object location mapped to the object name. If the determination at 120 is negative, then the proxy location server determines if the object name is in the proxy location cache 40 (FIG. 1) by searching the proxy location cache 40 for the object name at 124. If the determination at 124 is affirmative, then at 126 the proxy location server 14 determines the object location by searching the proxy location cache 40 for the object name and the mapped object location.

If the determination at 124 is negative, then the proxy location server 14, at 128, sends a location query to the primary location server 18 (FIG. 1) requesting the location of the object named in the query. At 130, the primary location server 18 receives the location query, finds the location of the object named in the query by searching the object location list 44 (FIG. 1) for the object and the mapped location information, and sends a reply to the proxy location server 14 with the location of the object named in the query. The proxy location server 14 receives the reply and adds the location information for the object to the proxy location cache 40 at 132.

At 134, which is reached after execution of the process flow at 122, 126, or 132, the proxy location server 14 replies to the client 10 with the requested location of the object named in the query. The client 10 receives the location information for the object at 136. The client 10, at 138, adds the location information for the object to the client location cache 36. The client 10 then uses the location information to access the object at 112. The logic flow ends at 140.

An example of the interaction between the computers shown in FIG. 1 when the client 10 is instructed to access object alpha, with reference to the information in the data structures, is next described. The client 10 checks the client location cache 36 to determine if there is an entry for object alpha. The client 10 determines that there is not an entry for object alpha in the client location cache 36. The client 10 then checks the client location server list 38 to find out which location server 26 should be queried for the location information for object alpha. In the case shown in FIG. 1, the client 10 determines that proxy location server 14 is responsible for location information for object alpha. The client 10 then queries the proxy location server 14 requesting the location of object alpha. The proxy location server 14 receives the query and checks the proxy redirection list 42 to determine if there is an entry for object alpha. The proxy location server 14 determines that an entry for object alpha is in the proxy redirection list 42 and replies to the client 10 with the location of the surrogate payload server 12 as the location of object alpha. The client 10 adds an entry to the client location cache 36 mapping object alpha with the surrogate payload server 12 (the entry not shown in FIG. 1). The client 10 then initiates communication with the surrogate payload server 12 to access object alpha 30'.

An example of the interaction between the computers shown in FIG. 1 when the client 10 is instructed to access object bravo 32 is next described. The client 10 checks the client location cache 36 to determine if there is an entry for object bravo 32 and does not find an entry for object bravo 32. The client 10 then checks the client location server list 38 to determine which location server 26 should be queried for the location information for object bravo 32 and finds that the proxy location server 14 is mapped to object bravo 32. The client 10 then queries the proxy location server 14 for the location of object bravo 32. The proxy location server 14 receives the query and checks the proxy redirection list 42 for an entry for object bravo 32 and does not find one. The proxy location server 14 then checks the proxy location cache 40 for an entry for object bravo 32 and does not find one. The proxy location server 14 then queries the primary location server 18 for the location of object bravo 32. The primary location server 18 receives the query from the proxy location server 14 and checks the object location list 44 for the location of object bravo 32 and finds that the first primary payload server 20 is mapped to object bravo 32. The primary location server 18 replies to the proxy location server 14 with the location of object bravo 32 as the first primary payload server 20. The proxy location server 14 receives the reply and adds an entry to the proxy location cache 40 mapping object bravo 32 to the first primary payload server 20 (the entry is not shown in FIG. 1) and sends a reply to the client 10 with the location of object bravo 32 being the first primary payload server 20. The client 10 adds an entry to the client location cache 36 mapping object bravo 32 to the first primary payload server 20 (the entry is not shown in FIG. 1) and initiates communication with the first primary payload server 20 to access object bravo 32.

An example of the interaction between the computers shown in FIG. 1 when the client 10 is instructed to access object charlie 34 is next described. The client 10 checks the client location cache 36 to determine if there is an entry for object charlie 34 and determines that the second primary payload server 22 is mapped to object charlie 34. The client 10 then initiates communication with the second primary payload server 22 to access object charlie 34.

Using a proxy location server 14 (FIG. 1) having a proxy redirection list 42 to determine location information for objects allows the local administrative entity to easily add or remove a surrogate payload server 12 for one or more of the remote payload servers and to easily redirect clients 10 to use or not use the surrogate payload server 12. The local administrative entity does not need to obtain the permission of or to coordinate with a remote administrative entity before adding or removing a surrogate payload server 12. When the local administrative entity desires to add a surrogate payload server 12 incorporating one or more of the objects to avoid accessing the objects of a remote payload server, the local administrative entity adds the object to the surrogate payload server 12 and then adds an entry to the proxy redirection list 42 on the proxy location server 14 to direct the clients 10 to use the surrogate payload server 12 to access the object(s). Likewise, to disable a surrogate payload server 12 from operation with respect to certain objects, the local administrative entity removes the object names mapped to the surrogate payload server 12 from the proxy redirection list 42 on the proxy location server 14.

The examples described using computers at a local site and other computers at a remote site are useful to avoid the penalties of increased network latency in the communications between local and remote sites or an increased administrative burden in the case where the remote administrative entity is different from the local administrative entity. However, the invention does not necessarily require a local/remote distinction.

The proxy location server 14 can also detect when a payload server 28 is unresponsive and under such circumstances stop including location information of that payload server 28 in response to location queries. A check for unresponsiveness can be performed with a standard ping test for the purpose of verifying a communication connection to a port on the payload server 28 that provides the service. Checking for unresponsive payload servers 28 prevents the proxy location server 14 from directing a client 10 to use a payload server 28 that is not available.

The proxy location server 14 can also reply to queries for location information with multiple locations for the requested object. A client 10 that receives multiple locations for the requested object is then able to choose a second payload server 28 to access for the object in the event that the first-chosen payload server is or becomes unavailable. Responding to location queries with multiple locations per object also allows the proxy location server 14 to include predetermined priority information assigned to each of the payload servers 28 at the multiple locations. Predetermined priority information informs a client that certain payload servers 28 should be accessed before other payload servers 28.

The proxy location server 14 can also use a data structure (not shown) which constitutes a proxy location server list. Such a proxy location server list is similar to the client location server list 38, except that it is associated with the proxy location server 14 rather than the client 10. By using a proxy location server list, the proxy location server 14 can consult more than one primary location server 18. Consulting more than one primary location server 18 may be desirable if more than one primary location server is responsible for the primary object location information of the objects and payload servers 28 accessed by the clients 10. A local primary location server could also be set up at the local site 16 to provide location information for the local site.

Figure 6:
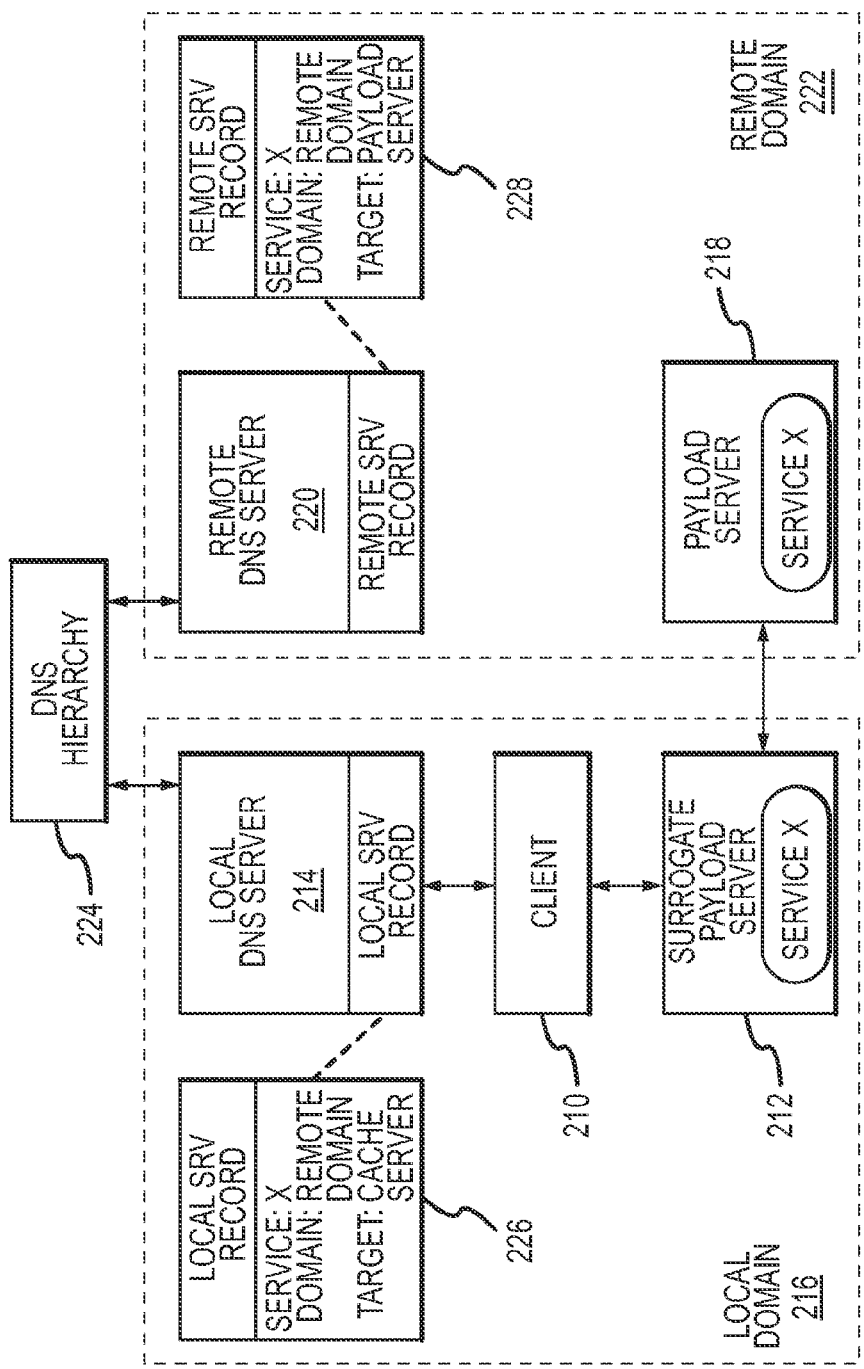
FIG. 6 is a diagrammatic illustration of local and remote Domain Name System (DNS) servers and their interconnection in a network forming another embodiment of the present invention.

Another embodiment of the present invention is shown in FIG. 6. A client 210, a surrogate payload server 212 and a local Domain Name System (DNS) server ("local DNS server") 214 are located in a local domain 216. A payload server 218 and a remote DNS server 220 are located in a remote domain 222.

To communicate between the client 210 and the server 214 or 220, it is typical to use an Internet Protocol (IP) address which is usually uniquely associated with each computer. An IP address can be expressed as a series of numbers separated by dots which represents a unique address on a network. An IP address is not typically easy or convenient for humans to remember. Consequently, hostnames are correlated uniquely with the IP address of each computer. Hostnames are typically easier-to-remember words which are used to refer to specific computers more conveniently than IP addresses. Domain names are also used to facilitate network communication between computers. A domain name refers to a domain, which refers to a uniquely-named collection of computers and to which there is often assigned a range of IP addresses. Domain names are also used to differentiate different collections of computers. Domain names also facilitate network communications by allowing a particular computer to be referenced within a domain by the combination of the hostname and the domain name, referred to as a Fully Qualified Domain Name (FQDN).

The DNS servers 214 and 220 are particular types of servers which associate hostnames with IP addresses. A DNS server can be authoritative for a specific domain or domains. "Authoritative" in this context means that the one DNS server is considered by other DNS servers to be the source of DNS related information for the domain. Thus, a DNS server contains information associating hostnames with IP addresses for the computers within the domains over which the DNS server is authoritative. Clients query a DNS server to discover information related to those computers within its domain, including the relationship between hostnames and IP addresses. In addition, DNS servers work in conjunction with other DNS servers in other domains to provide information to clients related to remote domains. This collection of interactive DNS servers available for use over the Internet is referred to herein as the "DNS hierarchy." DNS servers can act as surrogate servers for information from other DNS servers.

A particular type of record that a DNS server can store and serve information from is called a Service Record (SRV record). An SRV record primarily associates a particular service with a target server for a domain over which the DNS server is authoritative. Clients query the DNS server requesting the name of the server that provides a particular service in the domain, and the DNS server will respond with the address of the target server responsible for that particular service within its domain, provided that the DNS server has an SRV record with information associating the particular requested service with a target server location or address and the target server is capable of supplying that service within the domain.

The local DNS server 214 is responsible for associating hostnames with IP addresses for the computers within the local domain 216. The remote DNS server 220 is responsible for associating hostnames with IP addresses for the computers within the remote domain 222. Both the local DNS server 214 and the remote DNS server 220 are in communication with the DNS hierarchy 224.

The local DNS server 214 has a local SRV record 226 associating service X in the remote domain 222 with the surrogate payload server 212. Remote DNS server 220 has a remote SRV record 228 associating service X in the remote domain 222 with the payload server 218. The payload server 218 provides service X from the remote domain 222. Clients are directed to the payload server 218 by querying the remote DNS server 220 through the DNS hierarchy 224 for the location of the server responsible for providing service X in the remote domain. The SRV record 228 stored on the remote DNS server 220 contains the information associating service X in the remote domain 222 with the payload server 218.

The surrogate payload server 212 is a cache server of the payload server 218 which contains a substantially identical copy of the service X. The surrogate payload server 212 also provides service X to the client 210 in the local domain 216. The surrogate payload server 212 is in communication with the payload server 218 to obtain updates and changes to the service X as may be required.

Normally, the client 210 queries the local DNS server 214 for information related to the remote domain 222. Then, the local DNS server 214 forwards that request through the DNS hierarchy 224 to the remote DNS server 220. The remote DNS server 220 then responds to the information query. However, in accordance with the present invention, the client 210 queries the local DNS server 214 requesting the name of the server responsible for providing service X in the remote domain 222. Then, the local DNS server 214 consults the local SRV record 226 and replies to the client 210 with information that the surrogate payload server 212 provides service X in the remote domain 222. Thereafter the client 210 accesses the surrogate payload server 212 in the local domain to obtain the service X, rather than accessing the payload server 218 in the remote domain.

By adding an SRV record to a local DNS server for a different domain from that which the local DNS server is authoritative, a local administrative entity can direct local clients to a local surrogate server rather than a remote payload server. Adding an SRV record to a local DNS server to redirect clients to use a local surrogate server requires that the clients obtain location information for the remote payload server by querying for the information contained in an SRV record on the remote DNS server.

The use of a proxy redirection list 42 on a proxy location server 14 (FIG. 1) or the use of an SRV record 226 (containing information for the remote domain) on a local DNS server 114 (FIG. 6) allows an administrative entity the ability to easily edit, in one location, information which will cause clients to be redirected to or from a local surrogate server of a remote payload server. The local administrative entity is thus enabled to add or remove local surrogate servers of remote payload servers without having to manually configure information on individual clients and without having to coordinate with or receive permission from the remote administrative entity responsible for the remote payload server.

The use of a proxy redirection list on a proxy location server or an SRV record on a local DNS server to redirect local clients to use a local surrogate payload server of a remote payload server reduces the use costs associated with using the networks to communicate between the local and remote sites. Costs are reduced as a result of the reduced traffic across the networks. The response time that the clients experience in accessing the service or resources is also improved, thereby boosting productivity and efficiency.

Figure 7:
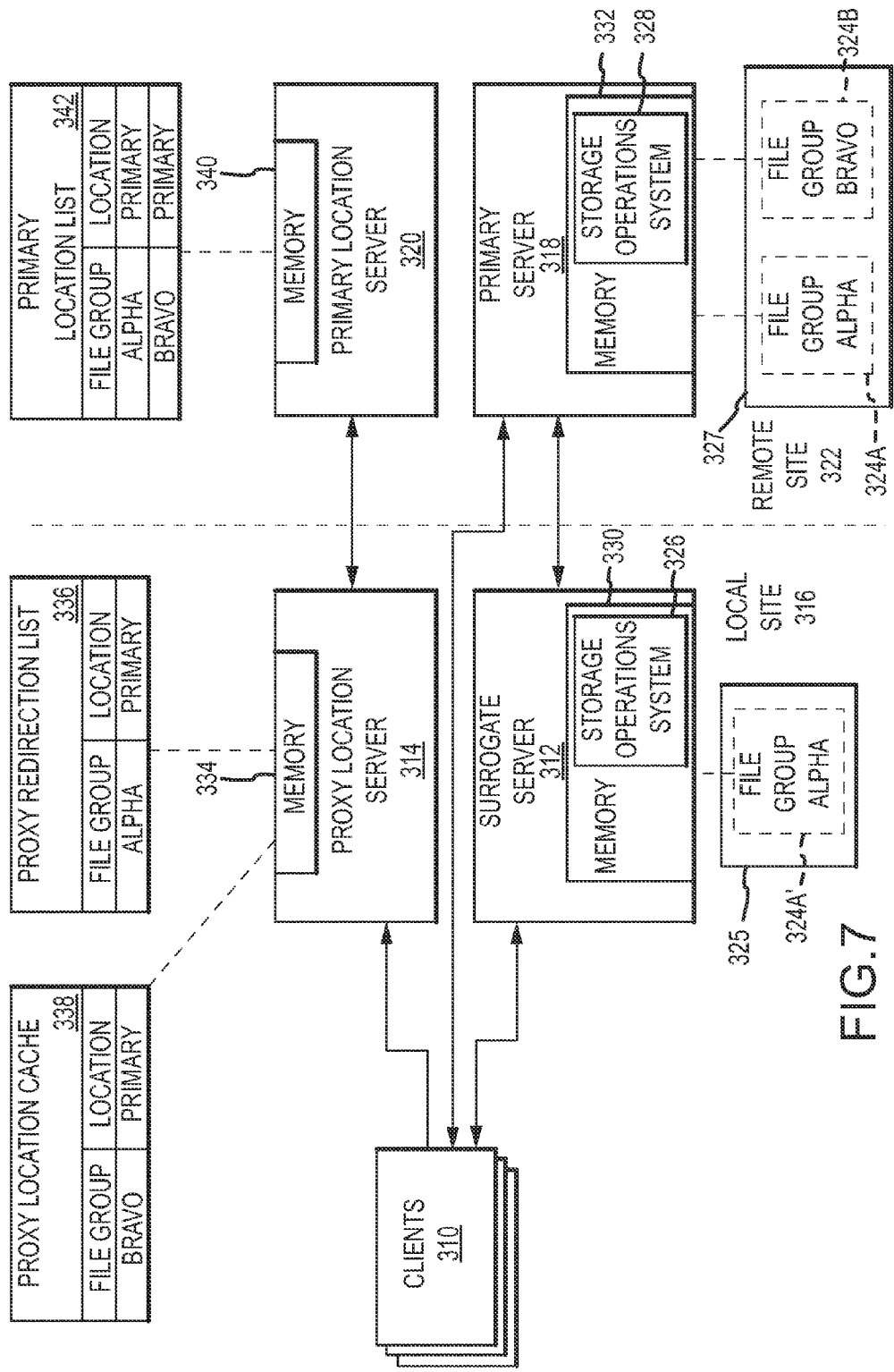
FIG. 7 is a diagrammatic illustration of local and remote computers and their interaction which form an embodiment of the present invention.

An embodiment of the invention which is useful for mass data storage purposes is shown in FIG. 7. Clients 310, a surrogate server 312 and a proxy location server 314 are located at a local site 316. A primary server 318 and primary location server 320 are located at a remote site 322. The surrogate server 312 takes on the role of the surrogate payload server 12 (FIG. 1) and the primary server 318 takes on the role of the primary payload server I 20 (FIG. 1). File groups alpha 324A, 324A' and bravo 324B take on the role of objects 30 and 32 (FIG. 1). File group alpha 324A' on the surrogate server 312 is a cache of file group alpha 324A on the primary server 318. Both file groups alpha 324A and 324A' and bravo 324B represent collections of files stored on a storage medium 325 or 327 connected to corresponding servers 312 or 318. The functionality among the servers in FIG. 7 is similar to that shown in FIG. 1 and previously described.

The surrogate and primary servers 312 and 318 each execute storage operating systems 326 and 328 which resides in a memory 330 and 332, respectively, of the servers 312 and 318. The storage operating systems 326 and 328 contain instructions which perform functions related to mass data storage. The storage operating system 326 allows the clients 310 access to the file group alpha 324A' on the surrogate server 312 and also communicates with the primary server 318 to obtain updated copies of files within the file group alpha 324A which are stored on the surrogate server 312. The storage operating system 328 allows the clients 310 access to both file groups alpha 324A and bravo 324B stored on the primary server 318.

The clients 310 query the proxy location server 314 for the location of file groups alpha or bravo and the proxy location server 314 responds with location information for the file group named in the query. After receiving the location information for a file group from the proxy location server 314, the clients 310 then access one of the servers 312 or 318 and access the file group.

The proxy location server 314 has stored in a memory 334 a proxy redirection list 336 and a proxy location cache 338. Both the proxy redirection list 336 and the proxy location cache 338 associate file groups with locations of a server hosting the file group, in a manner similar to how the proxy location server 14 (FIG. 1) associates object names and object locations. The proxy redirection list 336 is edited by a local administrator of the proxy location server 314 in response to the addition or removal from the local site 316 of surrogate servers, such as surrogate server 312. The proxy location cache 338 is populated with information obtained by location queries from the proxy location server 314 to the primary location server 320.

The primary location server 320 has a memory 340 in which is stored a primary location list 342. The primary location list 342 associates file groups with locations, in a similar manner to how the primary location server 18 (FIG. 1) associates object names and object locations. In response to a location query from the proxy location server 314 seeking the location of a file group, the primary location server 320 reads the location information for that file group from the primary location list 342 and sends that location information to the proxy location server 314. The proxy location server 314 then adds that location information to the proxy location cache 338.

Clients 310 may obtain file services from a local surrogate server rather than obtaining the file services from a remote server through the use of the proxy location server 314. Redirecting the clients 310 to use a surrogate server to access a file group at the local site 316 is accomplished by adding to the proxy redirection list 336 of the proxy location server 314, location information associating the file group with the surrogate server. Similarly, a surrogate server can be removed from the local site 316 and the clients directed to use the primary server hosting a desired file group by removing from the proxy redirection list 336 the location information associating that file group with the surrogate server being removed. Obtaining file services from local servers improves the performance of the file service experienced by the clients, among other benefits. The ability to easily add and remove local surrogate servers, as the demands for file services at the local site increase or decrease, gives the local administrators increased control over the performance and efficiency of the clients requesting those services.

These and other improvements and advantages will be more apparent after comprehending the full ramifications of the present invention. Presently preferred embodiments of the present invention and many of its improvements have been described with a degree of particularity. These descriptions are of preferred examples of the invention, and are not necessarily intended to limit the scope of the invention. The scope of the invention is defined by the following claims.

What is claimed is:

1. A server comprising:
a processor; and
a computer readable storage medium having program instructions stored therein, the program instructions executable by the processor to cause the server to,
in response to a request from a client to access an instance of an object,
determine whether location information stored at the server indicates location of the instance of the object at one or more of a surrogate payload server and a primary payload server, wherein
the primary payload server and the surrogate payload server are implemented using separate computers,
the location information stored at the server comprises derived location mappings between names of objects and locations of instances of objects, and
the derived location mappings are generated from responses to queries by the server to another server querying for location information of instances of objects,
obtain the location of the instance of the object from the other server if the server determines that the location information stored at the server does not indicate the location of the instance of the object, and
generate a reply to the request from the client, wherein the reply indicates the location information of the instance of the object as one or more of the surrogate payload server and the primary payload server.

2. A server as defined in claim 1, wherein
the reply indicates the location information of the instance of the object as the primary payload server if the server determines that the derived information mappings stored at the server indicate the location of the instance of the object referenced by the request from the client.

3. A server as defined in claim 2, wherein
the location information stored at the server further comprises redirection location mappings between object names and locations of instances of objects, and
the reply to the request from the client indicates, if the server further determines that the redirection location mappings indicate the location of the instance of the object,
at least one location mapping for the named instance of the object from the redirection location mappings, and
at least one location mapping for the instance of the object derived from the second location server.

4. A server as defined in claim 3, wherein
the program instructions are further executable by the processor to cause the server to
assign a priority value to each of the plurality of location mappings in the reply, and
include the assigned priority values in the reply.

5. A server as defined in claim 3, wherein
the program instructions are further executable by the processor to cause the server to
communicate in the reply information regarding any payload servers which the server determines to be unavailable.

6. A server as defined in claim 1, wherein
a first administrative entity is configured to manage the server, and
a second administrative entity is configured to manage the other server.

7. A server as defined in claim 1, wherein
each of the derived location mappings comprises one of a network address or a hostname of the payload server hosting the instance of the object.

8. A server as defined in claim 1, wherein
the program instructions are further executable by the processor to cause the server to communicate with additional servers to obtain location information for instances of objects.

9. A server as defined in claim 1, wherein
the client is located in a geographic area that is different from a geographic area where the primary payload server is located.

10. A method comprising:
responsive to a request from a client to access an instance of an object, determining whether location information stored at a server indicates location of the instance of the object at one or more of
a surrogate payload server and a primary payload server, wherein
the primary payload server and the surrogate payload server are implemented using separate computers,
the location information stored at the server comprises derived location mappings between names of objects and locations of instances of objects, and
the derived location mappings are generated from responses to queries by the server to another server querying for location information of instances of objects;
responsive to a determination that the location information stored at the server does not indicate the location of the instance of the object, obtaining the location of the instance of the object from the other server; and
generating a reply to the request from the client, wherein
the reply indicates the location information of the instance of the object as one or more of the surrogate payload server and the primary payload server.

11. A method as defined in claim 10, wherein
the reply indicates the location information of the instance of the object as the primary payload server if the server determines that the derived information mappings stored at the server indicate the location of the instance of the object referenced by the request from the client.

12. A method as defined in claim 10, wherein
the instance of the object hosted by the primary payload server comprises file data, and
the instance of the object hosted by the surrogate payload server comprises a copy of the file data.

13. A method as defined in claim 12, wherein
the instance of the object hosted by the surrogate payload server comprises a mirrored copy of the file data.

14. A method as defined in claim 10, wherein
the primary payload server and the surrogate payload server are configured to provide file services.

15. A non-transitory computer-readable memory medium comprising program instructions for a server, wherein the program instructions are executable to:
in response to a request from a client to access an instance of an object, determine whether location information stored at a server indicates location of the instance of the object at one or more of a primary payload server and a surrogate payload server, wherein
the primary payload server and the surrogate payload server are implemented using separate computers,
the location information stored at the server comprises derived location mappings between names of objects and locations of instances of objects, and
the derived location mappings are generated from responses to queries by the server to another server querying for location information of instances of objects,
obtain the location of the instance of the object from the other server if the server determines that the location information stored at the server does not indicate the location of the instance of the object, and
generate a reply to the request from the client, wherein
the reply indicates the location information of the instance of the object as one or more of
the surrogate payload server and the primary payload server.

16. A non-transitory computer-readable memory medium as defined in claim 15, wherein
the reply indicates the location information of the instance of the object as obtained from the derived location mappings if the server determines that the derived information mappings stored at the server indicate the location of the instance of the object.

17. A non-transitory computer-readable memory medium as defined in claim 16, wherein
the location information stored at the server further comprises redirection location mappings between object names and locations of instances of objects, and
the reply indicates, if the server further determines that the redirection mappings indicate the location of the instance of the object,
both the location associated with the object name obtained from the derived location mappings and the location associated with the object name obtained from the redirection location mappings.

18. A non-transitory computer-readable memory medium as defined in claim 17 further comprising program instructions are executable to
assign a priority value to each location in response to the request from the client.

19. A non-transitory computer-readable memory medium as defined in claim 17 further comprising program instructions are executable to,
  determine one or more payload servers which are unavailable to respond to requests for services from the client; and
  exclude the locations of the one or more payload servers which are unavailable when transmitting the reply to the client query.

20. A non-transitory computer-readable memory medium as defined in claim 17, wherein the server is separate from the other server.

* * * * *